US012637047B2

(12) United States Patent　　　　　(10) Patent No.:　US 12,637,047 B2
Schleinig et al.　　　　　　　　　　　(45) Date of Patent:　　May 26, 2026

(54) METHOD FOR ACTUATING A MECHANISM IN A BRAKE BOOSTER UNIT OF A BRAKING SYSTEM AND BRAKING SYSTEM

(71) Applicant: Robert Bosch GmbH, Stuttgart (DE)

(72) Inventors: Christian Schleinig, Stuttgart (DE); Florian Haag, Ellhofen (DE); Martin Marquart, Reichenbach (DE); Nikolas Loeffelmann, Dielheim (DE); Thorsten Maucher, Heidelberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 58 days.

(21) Appl. No.: 18/854,814

(22) PCT Filed: Mar. 13, 2023

(86) PCT No.: PCT/EP2023/056264
§ 371 (c)(1),
(2) Date: Oct. 7, 2024

(87) PCT Pub. No.: WO2023/232303
PCT Pub. Date: Dec. 7, 2023

(65) Prior Publication Data
US 2025/0326382 A1　　Oct. 23, 2025

(30) Foreign Application Priority Data
May 30, 2022　(DE) ..................... 10 2022 205 403.2

(51) Int. Cl.
B60T 13/16 (2006.01)
B60T 8/172 (2006.01)
(Continued)

(52) U.S. Cl.
CPC .............. B60T 8/173 (2013.01); B60T 8/172 (2013.01); B60T 8/44 (2013.01); B60T 13/16 (2013.01);
(Continued)

(58) Field of Classification Search
CPC ........ B60T 8/173; B60T 8/172; B60T 13/145; B60T 2220/04; B60T 2250/04; B60T 13/16; B60T 8/44; B60T 13/52
See application file for complete search history.

(56) References Cited

U.S. PATENT DOCUMENTS 4,932,727 A　*　6/1990　Wagner ................... B60T 8/449
　　　　　　　　　　　　　　　　　　　　　　　92/50
5,806,939 A　*　9/1998　Feigel ..................... B60T 8/268
　　　　　　　　　　　　　　　　　　　　　　　303/113.5
(Continued)

FOREIGN PATENT DOCUMENTS

DE　　102011112957 A1　　3/2013
DE　　102012211278 A1　　1/2014
GB　　　2186931 A　　8/1987

OTHER PUBLICATIONS

International Search Report for PCT/EP2023/056264, Issued Jun. 26, 2023.

*Primary Examiner* — Jacob M Amick
(74) *Attorney, Agent, or Firm* — NORTON ROSE FULBRIGHT US LLP

(57) ABSTRACT

A method for actuating a mechanism in a brake booster unit. The method includes: ascertaining, using a control unit of a vehicle system, whether a driver's braking request has ended or whether there is no driver's braking request; detecting, using the control unit, an operational disruption of the brake booster unit; detecting, using the control unit, an operational disruption of a pressure controller, which is connected to the brake booster unit and configured to generate a braking
(Continued)

pressure and/or a resetting pressure at a master brake cylinder unit of the brake booster unit; generating, using the vehicle system, a predetermined minimum pressure in the master brake cylinder unit and thereby resetting the mechanism and, by the mechanism, resetting a master brake cylinder into a neutral position.

10 Claims, 2 Drawing Sheets

(51) Int. Cl.
   *B60T 8/173*       (2006.01)
   *B60T 8/44*        (2006.01)
   *B60T 13/52*       (2006.01)
   *B60T 13/14*        (2006.01)

(52) U.S. Cl.
   CPC ............. *B60T 13/52* (2013.01); *B60T 13/145* (2013.01); *B60T 2220/04* (2013.01); *B60T 2250/04* (2013.01)

(56)                References Cited

U.S. PATENT DOCUMENTS

2011/0115281 A1*   5/2011   Jeon ......................... B60T 8/44
                                                           303/3
2018/0162336 A1    6/2018   Ngomssu et al.

\* cited by examiner ascertain whether driver's
braking request has ended detect operating disruption
of the brake booster unit detect operational
disruption of a pressure
controller generate predetermined
minimum pressure in the
master brake cylinder unit

S1    S2    S3    S4

METHOD FOR ACTUATING A MECHANISM IN A BRAKE BOOSTER UNIT OF A BRAKING SYSTEM AND BRAKING SYSTEM

FIELD

The present invention relates to a method for actuating a mechanism in a brake booster unit of a braking system and a braking system.

BACKGROUND INFORMATION

When using brake booster units, a return spring can shift the position of the master brake cylinder back to a neutral position after the braking process and thus reduce the braking pressure again. The return spring can rest on the housing of the master brake cylinder and limit the movement path of the master brake cylinder in the direction in which the braking pressure is generated. In other words, a brake cylinder piston can usually only move so far in the direction of the master brake cylinder until the return spring has been compressed.

Typically, resetting the transmission in the brake booster for a mechanical backup can be ensured by a single return spring. The so-called backup can relate to a failure of the motor, for example in the event of a power failure at the motor, wherein a braking action position of the master brake cylinder can be released in that the return spring can take over the return movement of the master brake cylinder and the transmission unit, which would normally be moved by the motor for resetting.

Electromechanical pressure actuators and brake control systems (ESP) are available, which together can form a braking system in a vehicle.

The ESP has valves, circular storage chambers and a pump to enable pressure to be increased and reduced for each individual wheel.

The primary pressure actuator is located upstream of the ESP and, depending on the braking request, acts on the pistons of the (tandem) master brake cylinder (TMC) to generate pressure. The pressure actuator can also receive the braking request from an external source (by-wire).

When pressure is being generated, the pressure actuator can also be operated in a controlled manner, but is additionally pushed back by the braking pressure and the return springs provided for this purpose.

Resetting until the snifting bores in the TMC open outside of a braking request may always be necessary.

The return spring in the pressure actuator takes up considerable installation space and always counteracts the pressure being generated.

A braking device is described in German Patent Application No. DE 10 2011 112 957.

SUMMARY

The present invention provides a method for actuating a mechanism in a brake booster unit of a braking system and a braking system.

Preferred further developments and example embodiments of the present invention are disclosed herein.

An idea of the present invention is to provide a method for actuating a mechanism in a brake booster unit and a braking system, wherein a function for resetting the mechanism of the brake booster unit from a braking state can be achieved without a return spring.

The resetting force can be used to ensure a force for resetting the master brake cylinder and a transmission unit for an electric motor, which can serve as an actuator of the master brake cylinder, and at the same time reduce the force acting against a driver's foot in the backup (brake release).

According to an example embodiment of the present invention, the method for actuating a mechanism in a brake booster unit of a braking system comprises ascertaining, by way of a control unit of a vehicle system, whether a driver's braking request has ended after a preceding braking operation by the brake booster unit or whether there is no driver's braking request at the brake booster unit after a preceding braking operation by the brake booster unit; detecting, by way of the control unit, an operational disruption of the brake booster unit; detecting, by way the control unit, an operational disruption of a pressure controller, which is connected to the brake booster unit or is present therein and is designed to generate a braking pressure and/or a resetting pressure at a master brake cylinder unit of the brake booster unit; generating, by way of the vehicle system, a predetermined minimum pressure in the master brake cylinder unit and thereby resetting the mechanism and, by said mechanism, resetting a master brake cylinder into a neutral position with reduced or no braking effect on a brake element when the driver's braking request has ended or when there is no longer a driver's braking request, wherein the generating of the minimum pressure is controlled by the control unit of the vehicle system.

The operational disruption may concern faults in the electrical system/supply, the electronics/ECU/μC/ASICs, a fault in the motor control unit or the motor itself, or a fault in the mechanism, which are detected and can result in a shutdown.

According to an example embodiment of the present invention, the pressure controller can be a component of the brake booster unit or the vehicle system. The pressure controller for a hydraulic-serial (by-wire) braking system according to the present invention can be a pressure/volume controller, which can be operated in a pressure-controlled manner, and an ESP connected in series behind it, which can also be operated in a pressure-controlled manner. The pressure-volume controller can be a plunger system, such as the brake booster components (primary actuator) themselves, while the ESP can have a pump. For example, the pressure actuator can be the primary actuator and the ESP the backup actuator. The ESP (which can also act as a pressure controller) can ascertain the residual pressure in or on the master brake cylinder, then becomes active and pushes the master brake cylinder back together with the brake booster mechanism.

The neutral position can correspond to a range for the position of the master brake cylinder in which a braking force on a brake may be reduced or not be present. The master brake cylinder can therefore be pushed from a braking position to the neutral position by the return spring when the brake is to be released. The master brake cylinder can be connected to other springs in the cylinder housing. The return spring may comprise a radius which is smaller than the radius of the cylinder housing, wherein the cylinder housing itself may have a cylindrical symmetry relative to the main direction of extension. The resetting pressure may be sufficient to push the master brake cylinder into the neutral position.

According to an example embodiment of the present invention, the control unit of a vehicle system, in particular of a vehicle stability system (ESP), can have a function, advantageously with program instructions for controlling a pressure actuator of this vehicle (stability) system or a pressure controller of the brake booster unit and thus advantageously a pump for transporting a volume of hydraulic fluid. This function advantageously detects the failure of the pressure controller or of the pressure actuator during a braking operation. By using the valves, storage chamber and pump in the ESP, this function in the ESP causes a volume flow in the direction of the master brake cylinder and takes over the resetting of the master brake cylinder pistons. In a broader sense, the storage chamber can also be the wheel brake cylinder, which can temporarily absorb more volume (and thus pressure) than necessary.

The mechanism may comprise a transmission, an actuator, an electric motor and/or other components for moving the master brake cylinder.

According to a preferred embodiment of the method of the present invention, the operational disruption of the brake booster unit relates to the resetting of the mechanism to the neutral position by the brake booster unit. The primary actuator (pressure actuator as the brake booster unit itself) can be active during all braking operations that require pressure to be built up on all four wheels of the vehicle. For example, during normal partial braking by the driver without brake control interventions. An operational disruption would then result in the mechanism/motor of the actuator no longer being able to return to the rest position with open shifting bores after the end of the braking request, which could result in unwanted residual pressure remaining in the system.

According to a preferred embodiment of the method of the present invention, for resetting, the vehicle system uses a pump to conduct a predetermined volume of hydraulic fluid from a storage chamber for the hydraulic fluid into the master brake cylinder unit, thereby generating the minimum pressure.

The storage chamber and the pump may be components of the vehicle system. The minimum pressure can be adaptively adjusted for the respective resetting effect (partial or complete resetting) or can be predetermined.

According to a preferred embodiment of the method of the present invention, a volume of hydraulic fluid present in the storage chamber is ascertained by the control unit before resetting, and is compared with a predetermined operating quantity, and, if the volume present is less than the predetermined operating quantity, an additional volume is sucked by the pump via sealing lips of a piston of the master brake cylinder from a prechamber of the master brake cylinder into the storage chamber to achieve the minimum pressure and is then pumped out of the storage chamber into a pressure region of the master brake cylinder. Mathematically, the amount of volume unintentionally locked in by the master brake cylinder is also exactly enough to push it back so far that the master brake cylinder unblocks the snifting bores again.

In the case of wheel brake cylinders, air may be introduced into the brake circuit via the seals on the wheel if there is a vacuum on the wheel brake cylinder. For this reason, having more volume than mathematically necessary on the suction side of the pump can be useful in order to push the pistons of the master brake cylinder back to at least the position of the snifting bores before a vacuum is set at the wheel.

The predetermined operating quantity can be such a quantity/volume of hydraulic fluid that it can currently generate a braking effect or no braking effect (such as resetting), depending on the specification.

The minimum pressure can be generated for resetting in the pressure region, for example by the pump.

According to a preferred embodiment of the method of the present invention, after the additional volume has been at least partially pumped into the pressure region, the step is repeated at least once, whereupon, before resetting, the volume of hydraulic fluid present in the storage chamber is ascertained and compared with a predetermined operating quantity, and, if the volume present is less than the predetermined operating quantity, an additional volume is sucked by the pump via sealing lips of a piston of the master brake cylinder from a prechamber of the master brake cylinder into the storage chamber in order to achieve the minimum pressure and is then pumped from the storage chamber into a pressure region of the master brake cylinder. Repeating can be optional and is not mandatory. The function must always be started if the ESP detects an unintentional residual pressure.

According to a preferred embodiment of the method of the present invention, the control unit detects the presence of the driver's braking request via a pedal position and/or by ascertaining a vehicle speed and/or via a driver interface.

According to a preferred embodiment of the method of the present invention, the control unit is a control unit of a vehicle stability system.

According to a preferred embodiment of the method of the present invention, the minimum pressure is sufficient to open a snifting bore when resetting the master brake cylinder.

The ESP can advantageously detect whether or not there is an operational disruption to the pressure controller and/or the brake booster unit.

Advantageously, such detection can take place via conventional mechanisms such as network monitoring or the forwarding and detecting of an electrical signal from the pressure controller and/or the brake booster unit.

For this purpose, the ESP can advantageously check whether there is a braking request, which can be possible via an interface, such as a signal interface in the vehicle and/or in the ESP.

In the event that a braking request is present, the task of the ESP can be to generate a certain pressure at the wheels (brakes at the wheels) as a substitute regulator for the brake booster. This function can be activated if there is no braking request, but it cannot be ruled out that there may still be residual pressure in the braking system and/or in the ESP.

The function on the ESP can become active and then pump a volume (of hydraulic fluid) towards the master brake cylinder (for example a tandem master brake cylinder TMC) to generate pressure against the master brake cylinder pistons if the snifting bores have not yet been opened.

According to an example embodiment of the present invention, in the event that there is too little volume in the ESP, using a pump the ESP can first suck in volume via the sealing lips of the master brake cylinder, which sealing lips can act as a check valve. The HSV (high pressure switching valve) enables the ESP to suck volume from the TMC/reservoir after opening and in this case is open and the USV is closed (the switching valve enables the ESP to feed volume sucked from the reservoir to the wheels or to hold it at the wheels and/or the storage chamber). The EVs and AVs can also be open, but not simultaneously. Closed inlet valves (EV) to the wheels make it possible to prevent further pressure build-up at the wheel (typically during ABS braking).

It may be that EVs are open and AVs are closed, wherein the pump can then deliver volume to the wheels.

It may be that EVs are closed, AVs are open and the volume then flows automatically into the storage chamber or the pump draws from the storage chamber and delivers volume to the master brake cylinder, as AVs may be closed and USVs open.

They also allow the wheel volume to flow into the storage chamber or to the pump when the outlet valves (AVs) are closed and when they are open.

The valves can be switched one after the other.

First the pump can deliver volume to the wheels through open EVs. Then the pump can be switched off, the EVs close and the AVs open. Now the pump delivers volume from the wheels and the storage chamber towards the TMC.

The volume can advantageously be controlled by using a model (as a program instruction of the function in the control unit), which can know the history of the measured pressure and of the pumps as well as a valve activity.

A certain volume can be temporarily stored in the storage chamber.

If the storage chamber is at least partially filled, the ESP can start to return a volume to the master brake cylinder. For this purpose, the HSV and the EVs can be closed to convey the volume from the storage chamber towards the ESP. For the period in which the snifting bores of the master brake cylinder unit are closed, a pressure can be built up which resets the pistons and the mechanism located downstream with the motor for the mechanism. If necessary (e.g., if the volume from the storage chamber is too low), one or more of the previous steps can be repeated to ensure that the snifting bores are opened.

The method according to the present invention can be used in a braking system comprising ESP and an pressure actuator located upstream. A prerequisite may be that the ESP can determine that a residual pressure does not simultaneously represent a braking request. This is the case, for example, with a decoupled brake-by-wire system.

According to an example embodiment of the present invention, the braking system comprises a brake booster unit and a control unit of a vehicle system, wherein the brake booster unit is connected to the control unit and can be connected to a pressure controller or comprises a pressure controller, wherein the control unit is designed to ascertain whether a driver's braking request has ended after a preceding braking operation by the brake booster unit or whether there is no driver's braking request at the brake booster unit after a preceding braking operation by the brake booster unit; to detect whether there is an operational disruption of the brake booster unit; to detect whether there is an operational disruption of a pressure controller, wherein the pressure controller is connected to the brake booster unit or is comprised by the brake booster unit and is designed to generate a braking pressure and/or a resetting pressure at a master brake cylinder unit of the brake booster unit; and to generate, by way of the vehicle system, a predetermined minimum pressure in the master brake cylinder unit and thereby to effect a resetting of the mechanism and thereby a resetting of a master brake cylinder into a neutral position with reduced or no braking effect on a brake element when the driver's braking request has ended or when there is no longer a driver's braking request, wherein the generating of the minimum pressure can be controlled by the control unit of the vehicle system.

According to a preferred embodiment of the braking system, the control unit comprises a control unit of a vehicle stability system.

The braking system can also be characterized by the features mentioned in connection with the method and by the advantages of the method, and vice versa.

Further features and advantages of embodiments of the present invention arise from the following description with reference to the figures.

BRIEF DESCRIPTION OF THE DRAWINGS

The present invention is explained in greater detail below with reference to the embodiment examples indicated in the schematic figures.

In the figures, identical reference signs denote identical or functionally identical elements.

DETAILED DESCRIPTION OF EXAMPLE EMBODIMENTS

Figure 1:
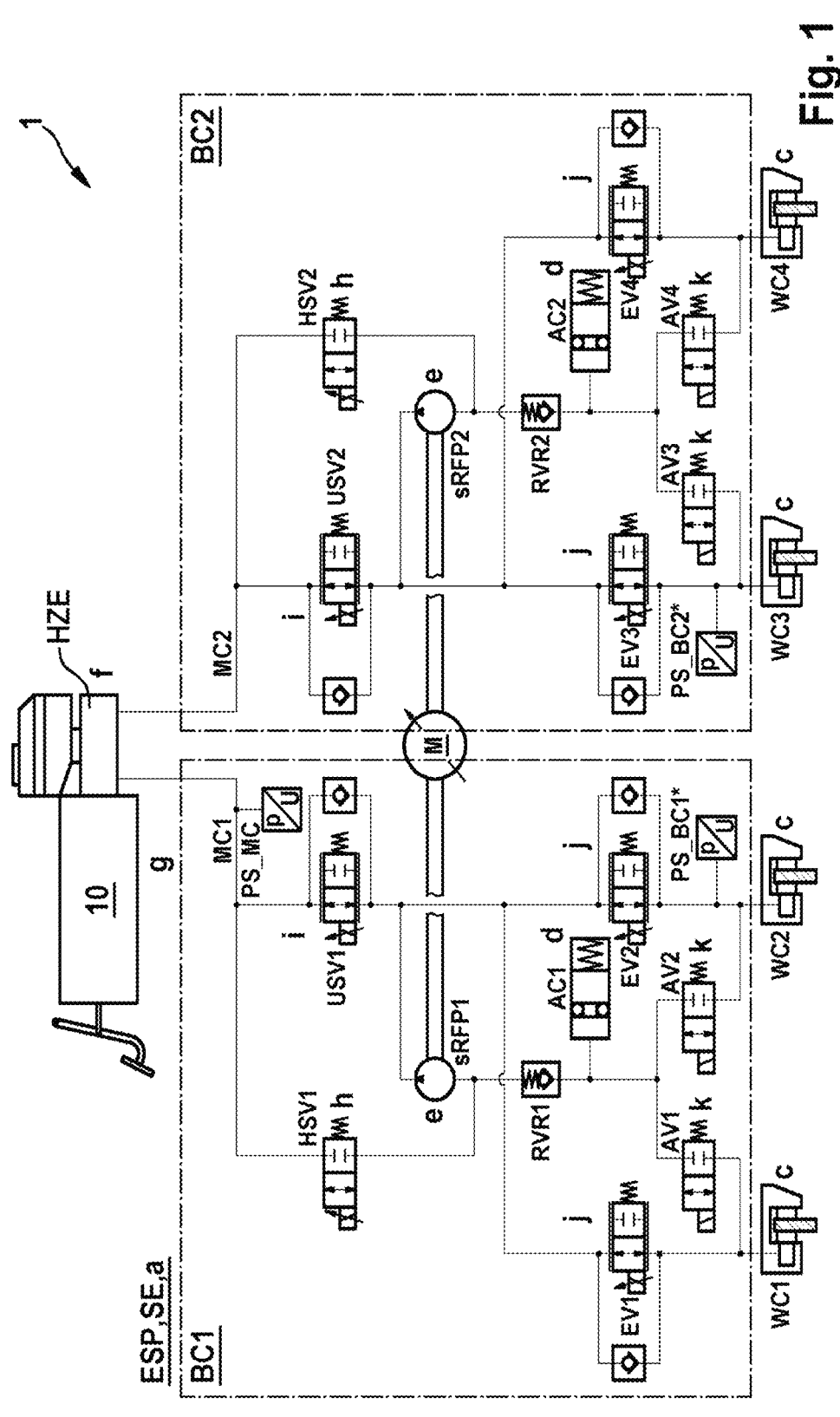
FIG. 1 shows a schematic illustration of a braking system according to an embodiment example of the present invention.

FIG. 1 shows a schematic illustration of a braking system according to an embodiment example of the present invention.

Braking system 1 is shown having brake booster unit 10 and a control unit SE of a vehicle system ESP, wherein the brake booster unit 10 is connected to the control unit SE and can be connected to a pressure controller or comprises a pressure controller (this can mean the brake booster unit 10 or the ESP or another pressure controller), wherein the control unit SE is designed to ascertain, by way of the control unit SE, whether a driver's braking request has ended after a preceding braking operation by the brake booster unit 10 or whether there is no driver's braking request at the brake booster unit 10 after a preceding braking operation by the brake booster unit 10; to detect whether there is an operational disruption of the brake booster unit 10; to detect whether there is an operational disruption of a pressure controller, wherein the pressure controller is connected to the brake booster unit and is designed to generate a braking pressure and/or a resetting pressure at a master brake cylinder unit HZE of the brake booster unit 10; and to generate, by way of the vehicle system ESP, a predetermined minimum pressure in the master brake cylinder unit HZE and thereby to effect a resetting of the mechanism and thereby a resetting of a master brake cylinder into a neutral position with reduced or no braking effect on a brake element when the driver's braking request has ended or when there is no longer a driver's braking request, wherein the generating of the minimum pressure can be controlled by the control unit of the vehicle system.

The ESP a detects the failure of the pressure actuator b. This can happen, for example, via conventional mechanisms such as network monitoring g or an electrical signal g. The ESP a can check whether a braking request is present. This is possible via a signal interface, for example with the control unit SE. If a braking request is present, the ESP can have the task of generating pressure in the wheels as a substitute regulator for the brake booster. The function can become active if there is no braking request, but it cannot be ruled out that there is still residual pressure in the system. The ESP function can be activated and aims to pump volume towards the TMC (HZE, f) in order to generate pressure against the TMC pistons if the snifting bores have not yet been opened. If there is too little volume in the ESP, the latter by means of pump e first draws volume over the sealing lips of the TMC, which act like a check valve.

The HSV h is open for this purpose and the USV i is closed. The EVs j and AVs k are also open. The volume can be balanced using a model that knows the history of the measured pressure and of the pumps e and valve activities (h, i, j, k). The volume is temporarily stored in the storage chamber d. Once the storage chamber d is at least partially filled, the ESP begins to return volume in the direction of the TMC f. For this purpose, the HSV h and the EVs j are closed in order to convey the volume from the storage chamber towards the ESP. As long as the snifting bores are closed, pressure is generated which resets the pistons and the mechanism with motor behind them.

Figure 2:
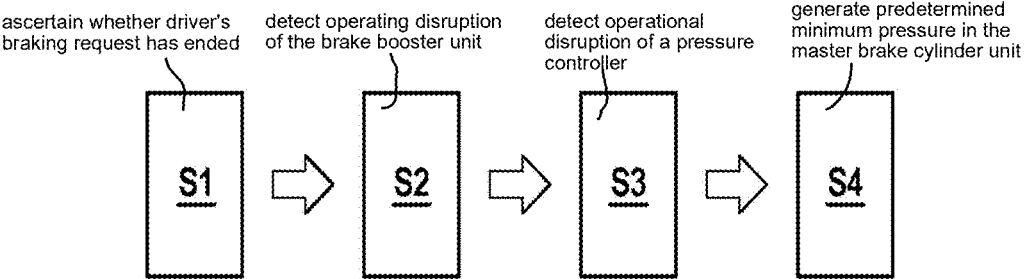
FIG. 2 shows a block diagram of process steps of the method for actuating a mechanism in a brake booster unit in a braking system according to an embodiment example of the present invention.

FIG. 2 shows a block diagram of method steps of the method for actuating a mechanism in a brake booster unit in a braking system according to an embodiment example of the present invention.

The method for actuating a mechanism in a brake booster unit of a braking system comprises ascertaining S1 by means of a control unit of a vehicle system whether a driver's braking request has ended after a preceding braking operation by the brake booster unit or whether there is no driver's braking request at the brake booster unit after a preceding braking operation by the brake booster unit; detecting S2, by way of the control unit, an operational disruption of the brake booster unit; detecting S3, by way of the control unit, an operational disruption of a pressure controller, which pressure controller is connected to the brake booster unit and is designed to generate a braking pressure and/or a resetting pressure at a master brake cylinder unit of the brake booster unit; generating S4, by way of the vehicle system, a predetermined minimum pressure in the master brake cylinder unit and thereby resetting the mechanism and by said mechanism resetting a master brake cylinder to a neutral position with reduced or no braking effect on a brake element when the driver's braking request has ended or when there is no longer a driver's braking request, wherein the generating of the minimum pressure is controlled by the control unit of the vehicle system.

Although the present invention has been completely described hereinabove with reference to the preferential embodiment example, it is not limited thereto and can be modified in a variety of ways.

The invention claimed is:

1. A method for actuating a mechanism in a brake booster unit in a braking system, comprising the following steps:

ascertaining, using a control unit of a vehicle system, whether a driver's braking request has ended after a preceding braking operation by the brake booster unit or whether there is no driver's braking request at the brake booster unit after the preceding braking operation by the brake booster unit;

detecting, using the control unit, an operational disruption of the brake booster unit;

detecting, using the control unit, an operational disruption of a pressure controller, which is connected or comprised by the brake booster unit, and is configured to generate a braking pressure and/or a resetting pressure at a master brake cylinder unit of the brake booster unit;

generating, using the vehicle system, a predetermined minimum pressure in the master brake cylinder unit and thereby resetting the mechanism and, by the mechanism, resetting a master brake cylinder to a neutral position with reduced or no braking effect on a brake element: (i) when the driver's braking request has ended, or (ii) when there is no longer a driver's braking request;

wherein the generating of minimum pressure is controlled by the control unit of the vehicle system.

2. The method according to claim 1, wherein the operational disruption of the brake booster unit relates to a resetting of the mechanism to the neutral position using the brake booster unit.

3. The method according to claim 1, where, using the vehicle system for the resetting, a predetermined volume of hydraulic fluid is fed from a hydraulic fluid storage chamber into the master brake cylinder unit, thereby generating the minimum pressure.

4. The method according to claim 3, wherein, before the resetting, the control unit ascertains a present volume of the hydraulic fluid in the storage chamber and compares the present volume to a predetermined operating quantity, and, when the present volume is less than the predetermined operating quantity, an additional volume is sucked by a pump via sealing lips of a piston of the master brake cylinder from a prechamber of the master brake cylinder into the storage chamber to achieve the minimum pressure and is then pumped out of the storage chamber into a pressure region of the master brake cylinder.

5. The method according to claim 4, wherein after the additional volume has been at least partially pumped into the pressure region, the step is repeated at least once, whereupon, before the resetting, the volume of hydraulic fluid present in the storage chamber is ascertained and compared with a predetermined operating quantity, and, when the volume present is less than the predetermined operating quantity, an additional volume is sucked by the pump via sealing lips from a prechamber of the master brake cylinder into the storage chamber in order to achieve the minimum pressure and is then pumped from the storage chamber into the pressure region of the master brake cylinder.

6. The method according to claim 1, wherein the control unit detects a presence of the driver's braking request via a pedal position and/or by ascertaining of a vehicle speed and/or via a driver interface.

7. The method according to claim 1, wherein the control unit is a control unit of a vehicle stability system.

8. The method according to claim 1, wherein the minimum pressure is sufficient to open a snifting bore when resetting the master brake cylinder.

9. A braking system, comprising:

a brake booster unit; and a control unit of a vehicle system;

wherein the brake booster unit is connected to the control unit and can be connected to a pressure controller or comprises a pressure controller, and wherein the control unit is configured to:

ascertain, using the control unit, whether a driver's braking request has ended after a preceding braking operation by the brake booster unit or whether there is no driver's braking request at the brake booster unit after a preceding braking operation by the brake booster unit; to detect whether an operational disruption of the brake booster unit is present, detect whether there is an operational disruption of the pressure controller, wherein the pressure controller is connected to or comprised by the brake booster unit and is configured to generate a braking pressure and/or a resetting pressure at a master brake cylinder unit of the brake booster unit, and generate, using the vehicle system, a predetermined minimum pressure in the master brake cylinder unit and thereby to reset a mechanism and thereby reset a master brake cylinder into a neutral position with reduced or no braking effect on a brake element when the driver's braking request has ended or when there is no longer a driver's braking request, wherein the generating of the minimum pressure can be controlled by the control unit of the vehicle system.

10. The braking system according to claim 9, wherein the control unit includes a control unit of a vehicle stability system.

* * * * *